G. Miller Sternberg.
4326
Automatic Regulator for Valves and Dampers.
REISSUED APR 4 1871
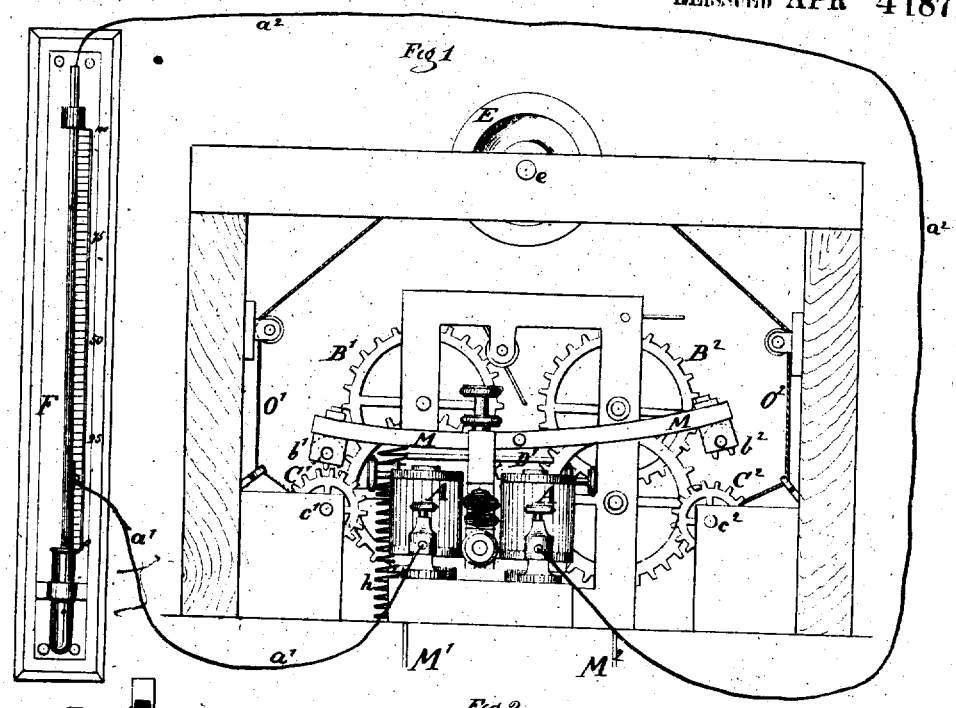
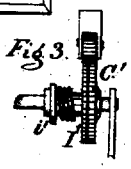
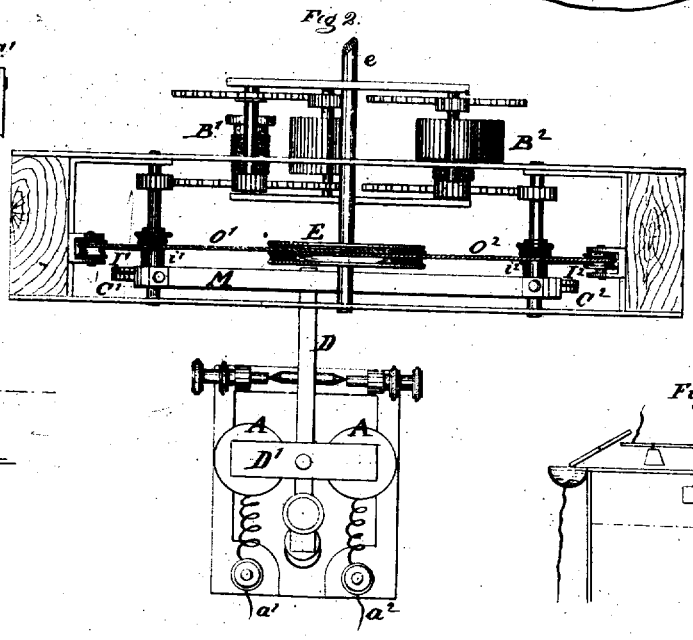
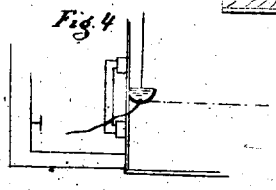
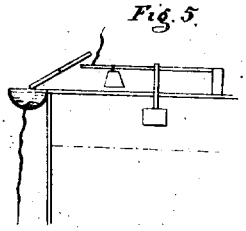
A. Hoermann
C. C. Livings
Inventor's Name
G. M. Sternberg
his atty
C. F. Stetson

United States Patent Office.

GEORGE MILLER STERNBERG, OF NEW YORK, N. Y.

Letters Patent No. 100,462, dated March 1, 1870; reissue No. 4,326, dated April 4, 1871.

IMPROVEMENT IN ELECTRO-MAGNETIC REGULATORS FOR TEMPERATURE IN ROOMS, &c.

The Schedule referred to in these Letters Patent and making part of the same.

*To all whom it may concern:*

Be it known that I, GEORGE MILLER STERNBERG, of the city and county of New York, State of New York, have invented certain new and improved Means for Automatic Regulation of Temperatures by means of a valve or damper; and I do hereby declare that the following is a full, clear, and exact description of what I consider the best construction and operation of the same, reference being had to the accompanying drawing making a part of this specification, in which—

Figure 1 is a side elevation.

Figure 2 is a plan view.

The remaining figures show the same clock-work, applied with a similar electro-magnet arranged to serve in relation to other apparatus.

Figure 3 shows certain parts detached.

Similar letters of reference indicate corresponding parts in all the figures.

Figure 4 is a view of part of an apparatus for regulating pressure of steam in a boiler by means of portion of my invention.

Figure 5 is a view of a reservoir-feed, similarly provided.

I will describe the invention only in its complete form as applied to the regulation of temperatures and employing a two-sided clock mechanism, by means of which a valve may be turned to the right or left, thus increasing or diminishing the flow of any gas or liquid through it which, by combustion or otherwise, produces the heat.

The valve-moving mechanism is regulated by a lever, which throws one or the other side of the apparatus into gear, causing the valve to be gradually turned on or off. This lever is worked by a temporary magnet, which, when an electrical current circulates through its helix, attracts an armature attached to the lever.

A galvanic battery of any kind may be used to produce the required electric current.

Interposed between the helix of the temporary magnet and the galvanic battery is the regulator, which, by establishing and breaking the current, as required, causes the lever worked by the temporary magnet to throw one or the other side of the valve-operating apparatus into gear. This regulator varies in different cases.

When the temperature of a gas or liquid is to be regulated, the regulator is a thermometer immersed in it, and so constructed that the rising or falling of the mercury in the thermometer establishes or breaks the circuit. This thermometer has a wire permanently communicating with the mercury in its bulb, and an adjustable wire which may be slipped into its tube for any desired distance.

The end of the adjustable wire having been thrust into the thermometer-tube to the point at which the temperature is to be maintained, and the valve-operating apparatus put in motion, the temperature of the liquid or gas is raised by the gradual opening of the valve which governs the supply of heat. This valve may be the damper of a furnace or a damper in a hot-air flue, a cock in a steam-pipe used for heating, or any similar contrivance.

In the drawing—

A A are helices surrounding a U-shaped electro-magnet, conveniently placed with reference to the double system of train-work $B^1$ $B^2$, which is operated by independent weights $M^1$ $M^2$.

One wire, $a^1$, of the battery runs into the bulb of a thermometer, F, supposed to be hung against the wall of an apartment, and has contact with the mercury.

The other wire, $a^2$, enters the top of the thermometer-tube and terminates at the point in the scale where the temperature of the room should be kept. Whenever the mercury is below this point the valve (not represented) by which warm air enters the room, is gradually opening.

When the atmosphere of the place is sufficiently heated to cause the mercury to rise so that it touches the end of the wire $a^2$, an electric circuit is established and the armature D' thereupon operates, by the lever D, to elevate one end of the lever M and depress the other end.

The extremities of the lever M carry small spur-gears $b^1$ $b^2$ at a sufficient height for a slight play of the lever above, two cog-wheels, $C^1$ $C^2$, fixed on shafts $c^1$ $c^2$, which are sustained in suitable fixed bearings. At their opposite ends these shafts are connected with the double system of train-work $B^1$ $B^2$, each half of the system being a counterpart of the other half, and each being set in motion in opposite directions by the weights $M^1$ $M^2$.

There is loosely mounted on each shaft $c^1$ $c^2$ a sleeve, which carries a cog-wheel of the same size and serration as the wheels $C^1$ $C^2$, and quite near the latter, but not necessarily in contact. These sleeves are marked, respectively, $i^1$ $i^2$, and the cog-wheels $I^1$ $I^2$.

The sleeves serve as windlasses, and around them are wound the extremities of cords $O^1$ $O^2$, which cords may be joined at the middle portion and passed over or around a wheel, E, fixed upon the valve-shaft *e*, so as to produce sufficient tension to turn the wheel, and thus operate the valve when the cord moves in either direction owing to the rotation of the windlasses $i^1$ $i^2$, but the wheels and windlasses can only receive motion from the train-work $B^1$ $B^2$ when thrown into gear in some manner therewith. They are alternately thus thrown into gear by the small spur-gears $b^1$ $b^2$ on the ends of the lever M, the spur-gears being wide enough to engage with both wheels $C^1$ $I^1$ or $C^2$ $I^2$ at once, and thus connect them, and communicate motion of the train-work to the valve-operating mechanism.

When the right spur-gear $b^2$ engages with the wheel $C^2$ under the operation of the levers D and M, the half $B^2$ of the double system of train-work is thrown into gear with the wheel $I^2$, and moves the valve attached to wheel E in the direction of closing. The valve either wholly or partially closes, and the result is to lower the temperature of the room sufficiently to cause the mercury to sink below the wire $a^2$.

When this happens, and the electric current is broken, the left spur-gear $b^1$ is made to engage, by a spring, *h*, or weight, with the opposite wheels $C^1$ $I^1$, which are rotated in the contrary direction to the wheels $C^2$ $I^2$, and thus cause the valve to move in the direction of opening.

The windlass $i^2$, being loose on its shaft, reverses its motion under the strain of the cord $O^2$ without interfering with the wheel $C^2$, which may still revolve undisturbed in its original direction. The same is true of the windlass $i^1$ when the valve is closing.

In this manner the temperature of any room heated by warm air from a furnace may be kept at any particular point without varying more than about half a degree on either side, as long as the supply-current continues to flow.

When the object to be obtained is the regulation of the temperature of a liquid, the thermometer F in fig. 1 is immersed in it.

It will now be understood that when the increasing temperature of the liquid or gas causes the mercury in the tube of the thermometer to reach the wire an electric circuit is completed, the current through the helix A causes the temporary magnet to attract the armature D′, and the lever attached to it throws out of gear the valve-opening part $B^1$ of the apparatus, and into gear the valve-closing part $B^2$. The consequence of this is a gradual reduction of the heat of the gas or liquid resulting from the gradual closing of the valve. This reduction of the temperature causes the mercury in the thermometer to fall below the point of the wire, and the electric circuit to be broken and the valve-opening part of the apparatus to again operate. Thus the mercury oscillates at the point of the wire, establishing and breaking the circuit, and keeping the liquid or gas nearly at a constant temperature.

When the pressure of steam or gases is to be regulated the regulator may be a safety-valve or a steam-gauge interposed in a corresponding circuit, so that the rising or falling of the lever of the safety-valve or the needle of the steam-gauge may make or break the circuit.

When the height of a liquid in a reservoir is to be regulated, a cup of mercury floating upon its surface establishes the circuit by meeting or receding from an adjustable wire. In such connection I can use the same double system of double train-work $B^1$ $B^2$, and lever M with gear $b^1$ $b^2$.

I am aware that thermometers have been attached directly to dampers, and that they have been attached directly to clutches which should put on and take off a power other than themselves; also, that they have been employed, in connection with electro-magnets, to cause the electro-magnet to act directly on a valve or damper; and that a British patent to one W. Smith, in 1857, shows all these several parts in combination; to wit:

The thermometer acting to connect and disconnect an electro-magnet, and the electro-magnet acting to connect and disconnect an independent power; but in Smith's said patent the power did not act directly on a valve to control temperature, but only indirectly, by varying the load on a loaded valve, so that the result was imperfect. The invention was impracticable, and did not come into use.

My invention produces a complete automatic regulation of temperature. I can, by its aid, keep the temperature of the apartment so that it shall not vary to be appreciated by the senses for an indefinite period.

I do not claim an automatic regulation of the temperature in a current of steam by varying the amount of feed-water, nor do I claim controlling valves by the attraction of electro-magnets controlled by thermometers.

Having thus described my invention,

What I claim as new, and desire to secure by Letters Patent, is—

1. The combination, with the armature of an electric apparatus, of the lever M, provided with spur-gears $b^1$ $b^2$, cog-wheels $C^1$ $C^2$, loose cog-wheels $I^1$ $I^2$, and double system of train-work $B^1$ $B^2$, operated substantially in the manner described, for the purpose of communicating motion alternately in opposite direction to the valve mechanism, as specified.

2. The within-described means for controlling the temperature of a building or an apartment; that is to say, the thermometer controlling an electro-magnet, the electro-magnet controlling an independent power, and the independent power operating directly to open and close a valve, which valve raises and lowers the temperature of the apartment, as herein set forth.

In testimony whereof I have hereunto set my name in presence of two subscribing witnesses

GEO. M. STERNBERG.

Witnesses:

C. C. LIVINGS,

J. A. SURFLEET.